US010456612B2

(12) United States Patent
McGhee (10) Patent No.: US 10,456,612 B2
(45) Date of Patent: Oct. 29, 2019

(54) PORTABLE EXERCISE APPARATUS

(71) Applicant: James McGhee, Willow Grove, PA (US)

(72) Inventor: James McGhee, Willow Grove, PA (US)

( * ) Notice: Subject to any disclaimer, the term of this patent is extended or adjusted under 35 U.S.C. 154(b) by 105 days.

(21) Appl. No.: 15/417,188

(22) Filed: Jan. 26, 2017

(65) Prior Publication Data

US 2018/0207463 A1   Jul. 26, 2018

Related U.S. Application Data

(60) Provisional application No. 62/450,560, filed on Jan. 25, 2017.

(51) Int. Cl.
*A63B 1/00* (2006.01)
*F16M 13/02* (2006.01)
*A63B 23/12* (2006.01)
*A63B 71/02* (2006.01)
(Continued)

(52) U.S. Cl.
CPC ............ *A63B 1/00* (2013.01); *A63B 23/1218* (2013.01); *A63B 71/023* (2013.01); *F16M 13/022* (2013.01); *A63B 2210/50* (2013.01); *A63B 2225/093* (2013.01); *F16B 2/08* (2013.01); *F16B 2/185* (2013.01)

(58) Field of Classification Search
CPC . F16B 2/005; F16B 2/08; F16B 2/185; F16M 13/022; A63B 1/00; A63B 3/00; A63B 7/00; A63B 21/00047; A63B 21/00185; A63B 21/068; A63B 21/08; A63B 21/15; A63B 21/151; A63B 21/153; A63B 21/154; A63B 21/157; A63B 21/159; A63B 21/16; A63B 21/1618; A63B 21/1627; A63B 21/1636; A63B 21/1645; A63B 21/1654; A63B 21/1663; A63B 21/169; A63B 21/4023; A63B 21/4027; A63B 21/4033; A63B 21/4035; A63B 21/4043; A63B 21/4045; A63B 21/4047; A63B 21/4049; A63B 23/12; A63B 23/1209; A63B 23/1218; A63B 23/1227; A63B 23/1245; A63B 23/1281; A63B 2208/0285; A63B 2208/029; A63B 2210/00; A63B 2210/50; A63B 2225/09; A63B 2225/093
See application file for complete search history.

(56) References Cited

U.S. PATENT DOCUMENTS

| | | | | |
|---|---|---|---|---|
| 2,943,876 | A | * | 7/1960 | Morris ...................... F16B 2/08 24/274 R |
| 4,512,570 | A | * | 4/1985 | Tardivel ................... A63B 7/04 182/42 |

(Continued)

*Primary Examiner* — Gary D Urbiel Goldner
(74) *Attorney, Agent, or Firm* — Muskin and Farmer LLC (57) ABSTRACT

A portable exercise apparatus configured to attach to a vertical structure. The apparatus includes a top strap attached to a hook and a bottom strap attached to a second hook, the top strap and bottom strap can be wrapped around the vertical structure and secured at the apparatus. The apparatus can be secured tightly against the vertical structure so it will not slip downward. A bar which can be perpendicular to a length of a body of the apparatus can be used for performing exercises such as pull-ups and/or chin-ups.

17 Claims, 9 Drawing Sheets

(51) Int. Cl.
    *F16B 2/08*         (2006.01)
    *F16B 2/18*         (2006.01)

(56) References Cited

U.S. PATENT DOCUMENTS

| | | | | |
|---|---|---|---|---|
| 4,977,643 A * | 12/1990 | Prysock | A22C 25/00 | 452/187 |
| 5,049,110 A * | 9/1991 | Owens | A22B 5/06 | 182/133 |
| 5,098,054 A * | 3/1992 | Dyer | F16B 2/08 | 248/225.11 |
| 5,423,730 A * | 6/1995 | Hirsch | A63B 21/06 | 482/904 |
| 5,562,534 A * | 10/1996 | McGough | A22B 5/06 | 452/125 |
| 5,820,455 A * | 10/1998 | Breedlove | A22B 5/06 | 452/187 |
| 6,045,442 A * | 4/2000 | Bounds | A22B 5/06 | 182/133 |
| 6,062,974 A * | 5/2000 | Williams | A22B 5/06 | 452/187 |
| 6,290,195 B1 * | 9/2001 | Deuer | A47B 96/06 | 248/230.8 |
| 6,322,483 B1 * | 11/2001 | Rotella | A63B 21/0552 | 482/121 |
| 6,695,688 B1 * | 2/2004 | Owen | A22B 5/06 | 452/185 |
| 6,739,964 B2 * | 5/2004 | Gearhart | A22B 5/06 | 452/187 |
| 6,994,618 B1 * | 2/2006 | Syers | A22B 5/06 | 452/187 |
| 7,341,507 B1 * | 3/2008 | Julian, Sr. | A22B 5/06 | 452/192 |
| 7,771,131 B2 * | 8/2010 | Scott | F16M 11/10 | 248/176.3 |
| 7,861,987 B2 * | 1/2011 | Gorsuch | F41B 5/14 | 124/86 |
| 7,913,980 B1 * | 3/2011 | Cipriano | B66D 3/08 | 248/218.4 |
| 8,016,134 B1 * | 9/2011 | Templin | F16M 13/022 | 211/107 |
| 8,062,106 B1 * | 11/2011 | Adams, III | A01K 5/0291 | 452/189 |
| 8,302,922 B1 * | 11/2012 | Robinson | A47G 25/08 | 211/107 |
| 8,607,497 B2 * | 12/2013 | Green | A01K 87/00 | 248/219.4 |
| 8,683,909 B1 * | 4/2014 | Copus | F41A 23/16 | 182/127 |
| D718,410 S * | 11/2014 | Woller | A22B 5/06 | D22/199 |
| 8,915,774 B1 * | 12/2014 | Hunter | A22B 5/06 | 452/187 |
| 9,068,788 B2 * | 6/2015 | Brown | F41A 23/02 | |
| 9,073,734 B1 * | 7/2015 | Cates | B66C 23/203 | |
| 9,089,125 B1 * | 7/2015 | Fast | E04G 3/24 | |
| 9,161,526 B2 * | 10/2015 | Nipper | A01M 31/02 | |
| D754,405 S * | 4/2016 | Herde | A22B 5/06 | D30/121 |
| D763,009 S * | 8/2016 | Murphy | F16M 13/02 | D6/556 |
| D773,603 S * | 12/2016 | Woller | A22B 5/06 | D22/199 |
| 9,777,886 B2 * | 10/2017 | Hall | A22B 5/06 | |
| 9,980,495 B2 * | 5/2018 | Parker | A22B 5/06 | |
| 2002/0183177 A1 * | 12/2002 | Hoffman | A61H 1/0218 | 482/148 |
| 2003/0178255 A1 * | 9/2003 | Auer | A01M 31/00 | 182/187 |
| 2003/0192741 A1 * | 10/2003 | Berkbuegler | A01M 31/02 | 182/187 |
| 2004/0087393 A1 * | 5/2004 | Wilson | A63B 63/083 | 473/483 |
| 2004/0087420 A1 * | 5/2004 | Montesquieux | A63B 21/0552 | 482/129 |
| 2006/0197001 A1 * | 9/2006 | Parker | F16M 11/10 | 248/230.8 |
| 2009/0078500 A1 * | 3/2009 | Wydner | A01M 31/02 | 182/3 |
| 2009/0321186 A1 * | 12/2009 | Louchart | A01M 31/02 | 182/188 |
| 2011/0049315 A1 * | 3/2011 | Buckbee | A01K 97/00 | 248/219.4 |
| 2011/0275490 A1 * | 11/2011 | Sener | A63B 25/00 | 482/75 |
| 2011/0302819 A1 * | 12/2011 | McGhan | F41A 23/18 | 42/94 |
| 2013/0075556 A1 * | 3/2013 | Pfeiler | F16M 11/045 | 248/221.11 |
| 2013/0324378 A1 * | 12/2013 | Rountree | A63B 21/0442 | 428/129 |
| 2014/0094327 A1 * | 4/2014 | Freund | A63B 69/0097 | 473/435 |
| 2014/0252188 A1 * | 9/2014 | Webster | F16M 13/022 | 248/229.17 |
| 2015/0225971 A1 * | 8/2015 | Gill | F16B 2/08 | 182/112 |
| 2016/0067550 A1 * | 3/2016 | Breach | A63B 69/0028 | 36/103 |
| 2016/0211574 A1 * | 7/2016 | Dundorf | H01Q 1/42 | |
| 2016/0324717 A1 * | 11/2016 | Burton | A61H 7/001 | |
| 2017/0203176 A1 * | 7/2017 | Moros | G09B 19/0038 | |
| 2018/0185690 A1 * | 7/2018 | Coulter | A63B 7/00 | |

\* cited by examiner

PORTABLE EXERCISE APPARATUS

BACKGROUND OF THE INVENTION

Field of the Invention

The present general inventive concept is directed to a method and apparatus directed to a portable exercise apparatus.

Description of the Related Art

Exercise apparatus (such as in a gym) can be heavy and not conducive to being portable. Active persons who may not have the opportunity to go to the gym (e.g., because they are out camping, etc.) would benefit from a portable apparatus which would enable physical exercises and activity. What is needed is a portable device which can be used for various physical exercises which can be easy to assembly and install.

SUMMARY OF THE INVENTION

It is an aspect of the present invention to provide an improved exercise device.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Reference will now be made in detail to the presently preferred embodiments of the invention, examples of which are illustrated in the accompanying drawings, wherein like reference numerals refer to like elements throughout.

The present inventive concept relates to a portable exercise apparatus which can typically fit inside a backpack or similar device. The portable exercise apparatus can be ideal for outdoor use which would enable a user to perform exercises outdoors that they previously had to perform indoors.

The portable exercise apparatus contains a top attachment mechanism and a bottom attachment mechanism both attached to a body. The top and bottom attachment mechanism each comprise a strap which can be wrapped around a stationary vertical structure such as a tree. Each strap can then be tightened by tightening a respective ratchet. A set of connectors can then be assembled which create an approximate 90 degree angle between a bar (the assembled connectors) and the vertical structure. The bar enables the user to perform exercises such as pull ups, etc. There are also various holes in the portable exercise apparatus so that karabiner clips can be locked therein, the karabiner clips can be attached to a variety of things such as a pulleys or other devices that utilize resistance to enable exercise.

Figure 1:
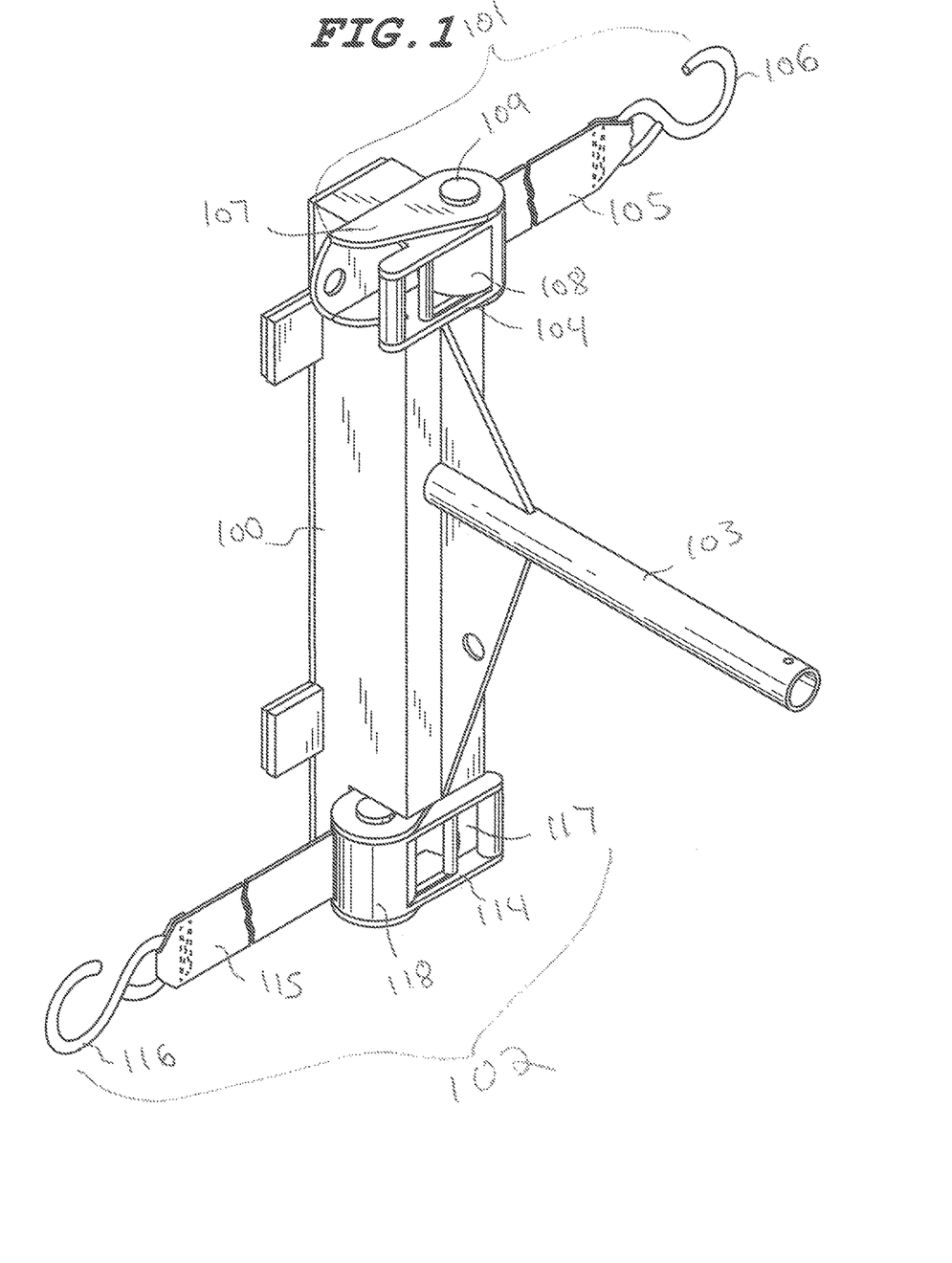
FIG. 1 is drawing of a portable exercise apparatus, according to an embodiment.

FIG. 1 is drawing of a portable exercise apparatus, according to an embodiment.

A body 100 is connected to a top attachment mechanism 101, a bottom attachment mechanism 102, and an integrated connector 103. The top attachment mechanism 101 and the bottom attachment mechanism 102 can both be any type of strap ratcheting system, such as the ERICKSON 34420 Pro Series Black 1"×6" Retractable Ratcheting Tie-Down Strap, or other similar off-the-shelf product (also known as ratchet tie down, ratchet strap, etc.) Strap ratcheting systems are known in the art and use a ratchet to tighten a strap and then the tension can be released by pressing a button or lever. The top attachment mechanism 101 and the bottom attachment mechanism 102 are the same (but for a different orientation of parts) and serve the same purpose (to enable a ratchet assembly to tighten the strap).

Top attachment mechanism 101 comprises a top ratchet arm 104, a top strap 105, a top hook 106, a top ratchet assembly 107, a top rotatable strap coil 108, and a top release button 109.

The top strap 105 is connected to the top hook 106. When the top ratchet arm 104 is activated (moved back and forth) the top strap 105 winds to enlarge the top rotatable strap coil 108 (as the top ratchet arm 104 is activated the top rotatable strap coil 108 would grow in size as more of the top strap 105 is wound around it) thus tightening the top strap 105 around the vertical structure. The top ratchet assembly 107 houses the top release button 109 and is affixed to the body 100. The top ratchet arm 104 can swing open and closed (see FIG. 4), FIG. 1 shows the top ratchet arm 104 in the closed (locked) position. When the top ratchet arm 104 is in the closed position, the top rotatable strap coil 108 is prevented from rotating by virtue of the top ratchet arm 104 being tightly fit inside the top ratchet assembly 107 thereby pressing tightly against the top rotatable strap coil 108 and preventing it from rotating (as well as an optional spring which creates tension on the top rotatable strap coil 108 as well). As the top strap 105 is pulled out from the top rotatable strap coil 108, the top spring (not pictured) is wound up tighter causing more spring tension. When the top release button 109 is pressed, tension is released on the top strap rotatable strap coil 108 and it is then permitted to freely rotate, wherein the spring tension will then automatically cause the top strap rotatable strap coil 108 to rotate (in the opposite direction of when the top strap 105 was pulled out) thereby automatically winding up the top strap 105 in the top strap rotatable strap coil 108.

As such, the top ratchet arm 104 can be opened, and the top strap 105 can be wound around a vertical structure (such as a tree) and connected back to the top ratchet assembly 107, tightened, and then the top ratchet arm 104 can then be closed creating a tight loop of the top strap 105 around the vertical structure.

Similarly, the bottom attachment mechanism 102 comprises a bottom a bottom ratchet arm 114, a bottom strap 115, a bottom hook 116, a bottom ratchet assembly 117, a bottom rotatable strap coil 118, and a bottom release button 119.

Figure 4:
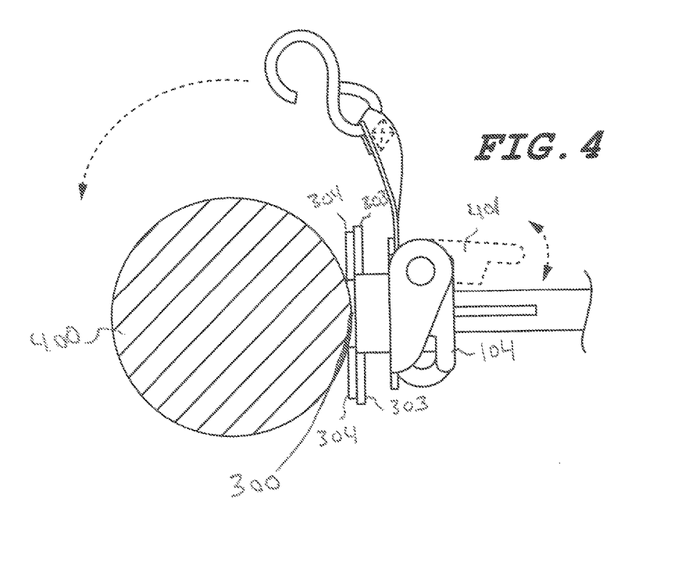
FIG. 4 is a drawing illustrating a top view of a top attaching mechanism in an unsecured position, according to an embodiment.

The bottom strap 115 is connected to the bottom hook 116. When the bottom ratchet arm 114 is activated (moved back and forth) the bottom strap 115 winds to enlarge the bottom rotatable strap coil 118 (as the bottom ratchet arm 114 is activated the bottom rotatable strap coil 118 would grow in size as more of the bottom strap 115 is wound around it) thus tightening the bottom strap 115 around the vertical structure. The bottom ratchet assembly 117 houses the bottom release button 119 and is affixed to the body 100. The bottom ratchet arm 114 can swing open and closed (in the same manner as the bottom ratchet arm 114 swings as illustrated in FIG. 4), FIG. 1 shows the bottom ratchet arm 114 in the closed (locked) position. When the bottom ratchet arm 114 is in the closed position, the bottom rotatable strap coil 118 is prevented from rotating by virtue of the bottom ratchet arm 114 being tightly fit inside the bottom ratchet assembly 117 thereby pressing tightly against the bottom rotatable strap coil 118 and preventing it from rotating (as well as an optional spring which creates tension on the bottom rotatable strap coil 118 as well). As the bottom strap 115 is pulled out from the bottom rotatable strap coil 118, the bottom spring (not pictured) is wound up tighter causing more spring tension. When the bottom release button 119 is pressed, tension is released on the bottom strap rotatable strap coil 118 and it is then permitted to freely rotate, wherein the spring tension will then automatically cause the bottom strap rotatable strap coil 118 to rotate (in the opposite direction of when the bottom strap 115 was pulled out) thereby automatically winding up the bottom strap 115 in the bottom strap rotatable strap coil 118.

As such, the bottom ratchet arm 114 can be opened, and the bottom strap 115 can be wound around the vertical structure and connected back to the bottom ratchet assembly 117, tightened, and then the bottom ratchet arm 114 can then be closed creating a tight loop of the bottom strap 115 around the vertical structure.

Both straps can be, for example one inch wide and four feet long, although of course any other dimensions can be used as well.

Figure 2:
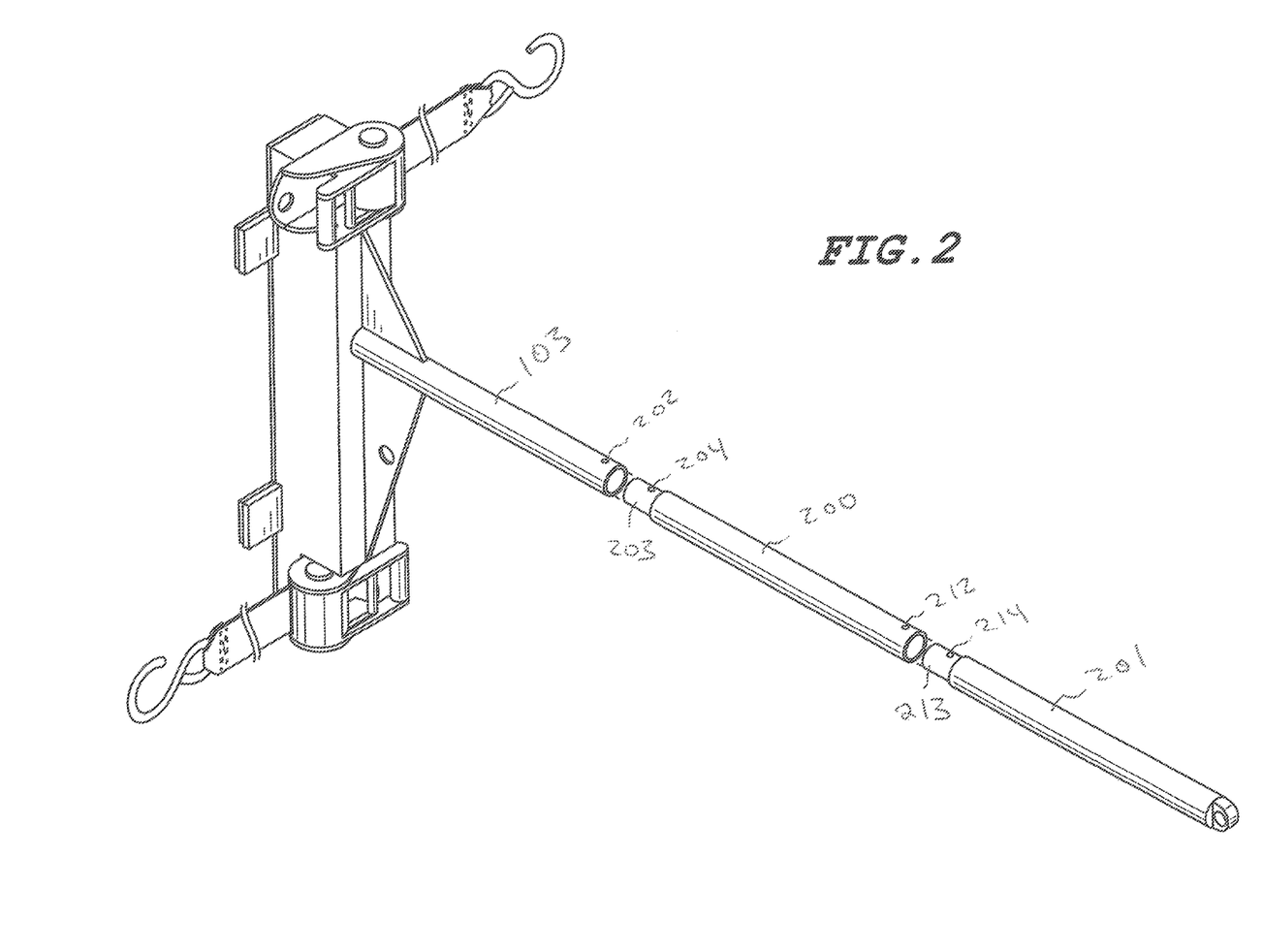
FIG. 2 is a drawing illustrating assembly of the connectors of the portable exercise apparatus, according to an embodiment.

FIG. 2 is a drawing illustrating assembly of the connectors of the portable exercise apparatus, according to an embodiment.

The integrated connector 103 (is permanently attached to the body 100) and removably attaches to the middle connector 200 which removable attaches to the end connector 201. Removably attaches means that when attached the attachment is firm and the end connector 201 can support a large weight (e.g., 500 lbs.), but all connectors can be disassembled easily into the separate connectors when desired (by pressing the respective buttons).

The integrated connector 103 comprises an integrated connector hole 202. The middle connector 200 comprises a middle connector recessed edge 203 and a middle connector button 204. The middle connector recessed edge 203 is configured (structured) to fit inside the integrated connector 103 (as shown). The middle connector button 204 is configured (structured) to fit inside the integrated connector hole 202. The middle connector button 204 can be made of metal or preferably a firm but malleable material (such as rubber, plastic, etc.) so it can deform slightly when the middle connector 200 is inserted inside the integrated connector 103 so that the middle connector recessed edge 203 will fit inside the integrated connector 103 and when the middle connector button 204 is positioned under the integrated connector hole 202 the middle connector button 204 would "snap" (and expand) inside the integrated connector hole 202 so that the middle connector 200 is now firmly attached to the integrated connector 103. The middle connector 200 can be detached (disassembled) from the integrated connector 103 by pressing on the middle connector button 204 and removing the middle connector 200 from the integrated connector 103.

The end connector 201 attaches to the middle connector 200 in the same way that the middle connector 200 attaches to the integrated connector 103. The middle connector 200 comprises a middle connector hole 212. The end connector 201 comprises an end connector recessed edge 213 and an end connector button 214. The end connector recessed edge 213 is configured (structured) to fit inside the middle connector 200 (as shown). The end connector button 214 is configured (structured) to fit inside the middle connector hole 212. The end connector button 214 can be made of metal or preferably a firm but malleable material (such as rubber, plastic, etc.) so it can deform slightly when the end connector 201 is inserted inside the middle connector 200 so that the end connector recessed edge 213 will fit inside the middle connector 200 and when the end connector button 214 is positioned under the middle connector hole 212 the end connector button 214 would "snap" (and expand) inside the middle connector hole 212 so that the end connector 201 is now firmly attached to the middle connector 200. The end connector 201 can be detached (disassembled) from the middle connector 200 by pressing on the end connector button 214 and removing the end connector 201 from the middle connector 200.

Thus, to assemble the bar, the user (typically after affixing the body to the vertical structure) attaches the middle connector 200 to the integrated connector 103 and the end connector 201 to the middle connector 200. To disassemble the connectors, the middle connector button 204 can be pressed and the middle connector 200 can be removed from the integrated connector 103, and the end connector button 214 can be pressed and the end connector 201 can be removed from the middle connector 200.

The integrated connector 103, middle connector 200, and end connector 201 should all typically be the same width (e.g., one inch, 1.25 inch, or any other amount). The integrated connector 103, middle connector 200, and end connector 201 can each be any length, such as 13 inches each (or any other length).

Note that while the middle connector 200 and the end connector 201 are shown having the recessed edge, any of the connectors can have the recessed edge (and button) which fits into an adjacent connector (with corresponding hole to receive the respective button). Thus, in other words, the integrated connector can have the recessed edge (and button) instead of the hole and the middle connector can have the hole and which receives the recessed edge of the integrated connector.

Figure 3:
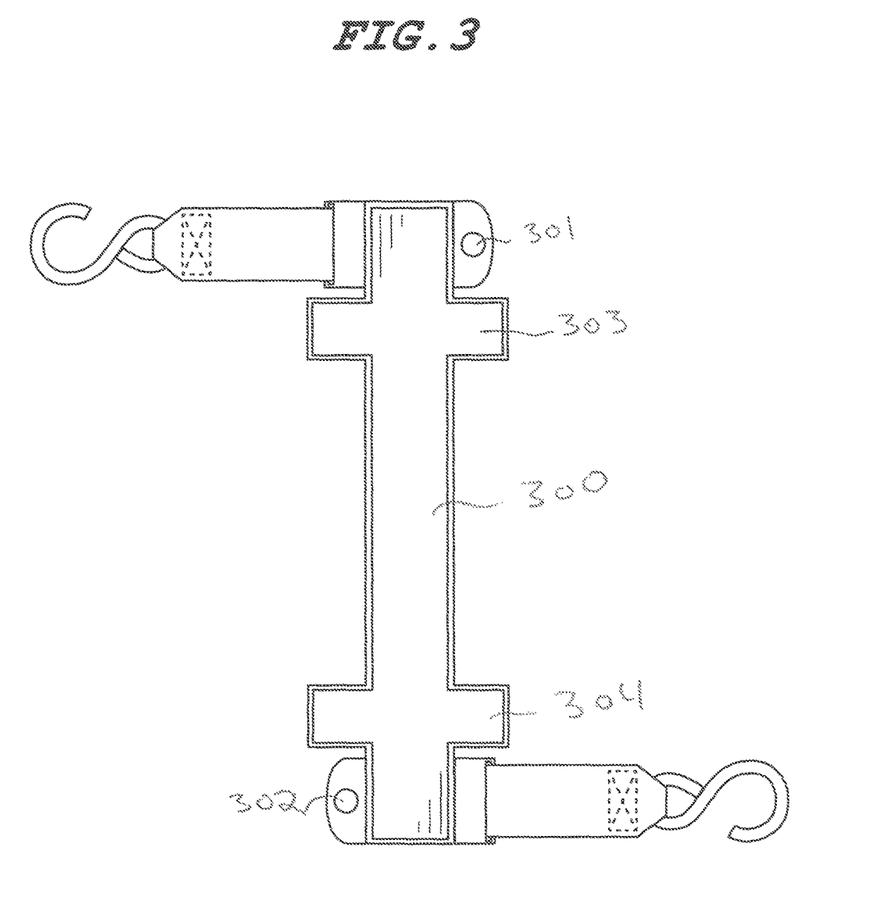
FIG. 3 is a drawing of a back view of the portable exercise apparatus, according to an embodiment.

FIG. 3 is a drawing of a back view of the portable exercise apparatus, according to an embodiment.

A body back 300 is a portion of the body that is pressed against the vertical structure. The body back 300 can be coated with a rubber coating (or other similar non-slip coating such as silicone, etc.) to prevent sliding of the body 100 down the vertical structure. A top hole 301 is present on the top ratchet assembly 107, and a bottom hole 302 is present in the bottom ratchet assembly 117. The top hole 301 is used to receive the top hook 106 when the top strap 105 is wrapped tightly around the vertical structure. The bottom hole 302 is used to receive the bottom hook 116 when the bottom strap 115 is wrapped tightly around the vertical structure.

An upper support 303 and a lower support 304 are present on the body back 300 and would abut the vertical structure being used.

FIG. 4 is a drawing illustrating a top view of a top attaching mechanism in an unsecured position, according to an embodiment.

The vertical structure 400 is shown abutting the body back 300. The top ratchet arm 104 is in the closed position although the open position 401 of the top ratchet arm 104 is shown in broken lines (the bottom ratchet arm 114 operates in the same manner).

Figure 5:
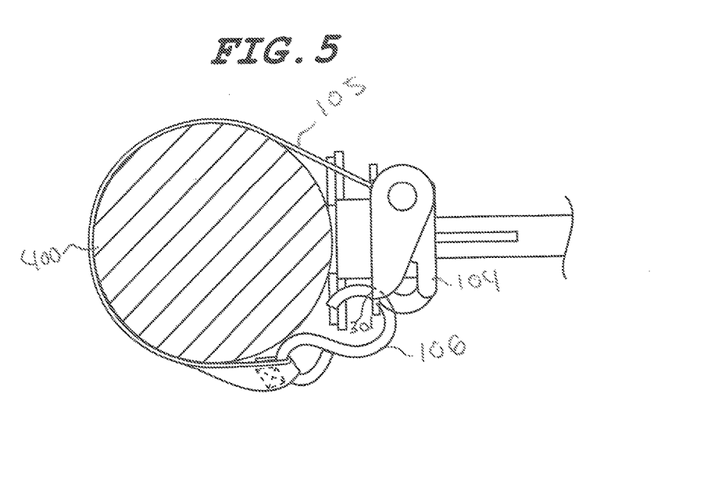
FIG. 5 is a drawing illustrating a top view of the top attaching mechanism in a secured position, according to an embodiment.

FIG. 5 is a drawing illustrating a top view of the top attaching mechanism in a secured position, according to an embodiment.

The top strap 105 is wrapped tightly around the vertical structure 400 and the top hook 106 is hooked into the top hole 301. The user can crank the top ratchet arm 104 back and forth until the top strap 105 is very tight around the vertical structure. The top ratchet arm 104 is pressed into the closed position thereby locking the top rotatable strap coil 108 from rotating thereby securing the top strap 105 around the vertical structure. The bottom strap 115 operates similarly to secure the body 100 to the vertical structure 400 utilizing its counterparts on the bottom attachment mechanism.

Figure 6:
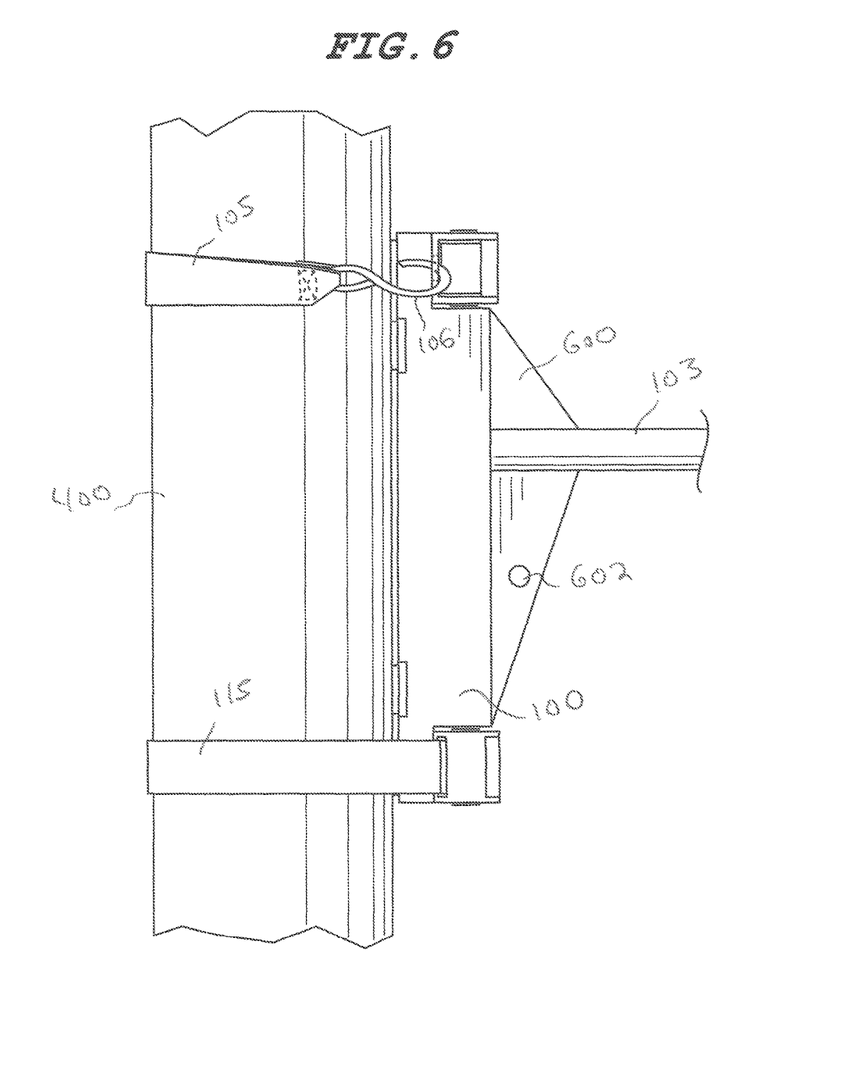
FIG. 6 is a drawing illustrating the portable exercise apparatus secured to a tree, according to an embodiment.

FIG. 6 is a drawing illustrating the portable exercise apparatus secured to a tree, according to an embodiment.

The top strap 105 is tightly wrapped around the vertical structure 400 with the top hook 106 securely hooked onto the top hole 301. The bottom strap 115 is tightly wrapped around the vertical structure 400 with the bottom hook 116 securely hooked onto the bottom hole 302 (not visible in FIG. 6).

A top triangular plate 600 and a bottom triangular plate 601 provide support between the body 100 and the integrated connector 103. A bottom triangular plate hole 602 is a hole in the bottom triangular plate 601 which can be used to receive any type of hook which can be attached to any other type of exercise mechanism (e.g., a pulley, resistance strap, etc.) so other exercises can be utilized with the portable exercise apparatus.

Figure 7:
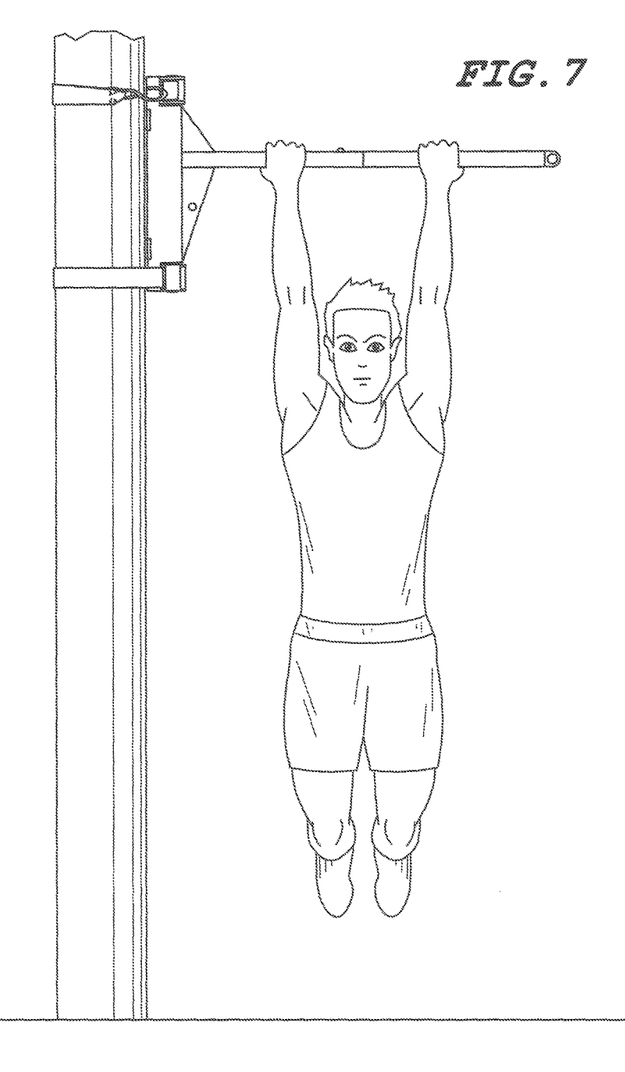
FIG. 7 is a drawing illustrating a potential use of the installed portable exercise apparatus, according to an embodiment.

FIG. 7 is a drawing illustrating a potential use of the installed portable exercise apparatus, according to an embodiment.

Shown is one possible use of the portable exercise apparatus. A user can utilize the portable exercise apparatus to do pull-ups, chin-ups, etc. A hook connected to a resistance strap (a strap which flexes when pulled) can be connected to the bottom triangular plate hole 602 so the user can perform other exercises as well (e.g., repeatedly pulling the resistance strap).

Note that the integrated connector is at a 90 degree angle (perpendicular) from a length of the body. The middle and end connectors are also at a 90 degree angle from the length of the body (e.g., the middle and end connectors extend the length of the integrated connector). Note that the integrated connector (and/or the middle connector and/or end connector) do not have to be at exactly a 90 degree angle with respect to the length of the body can be substantially at a 90 degree angle (e.g., 80 to 100 degrees).

Figure 8:
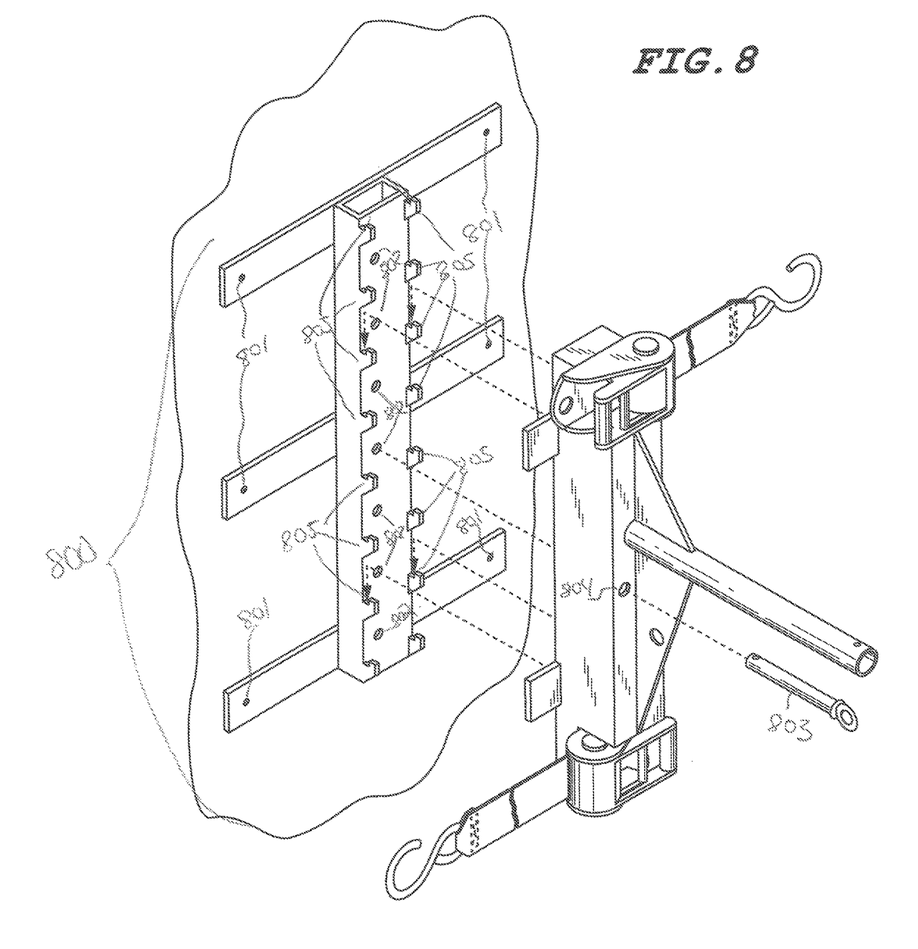
FIG. 8 is a drawing illustrating a wall mount used with the portable exercise apparatus, according to an embodiment.

FIG. 8 is a drawing illustrating a wall mount used with the portable exercise apparatus, according to an embodiment.

In this embodiment, the portable exercise apparatus can mount to a wall unit 800 which is permanently mounted onto a wall. In this embodiment, the straps (top strap 105 and bottom strap 115) are not needed to mount the portable exercise apparatus.

The wall unit 800 can be mounted to the wall via attachment units 801 (e.g., screws, nails, etc.) A set of wall unit holes 802 are configured to receive a key 803. A key hole 804 in the body 100 receives the key 803 which then inserts into one of the wall unit holes 802. A set of hooks 805 on the wall unit 800 is used to fit into grooves 900 on the back side of the body 100 (which are shown in FIG. 9).

Figure 9:
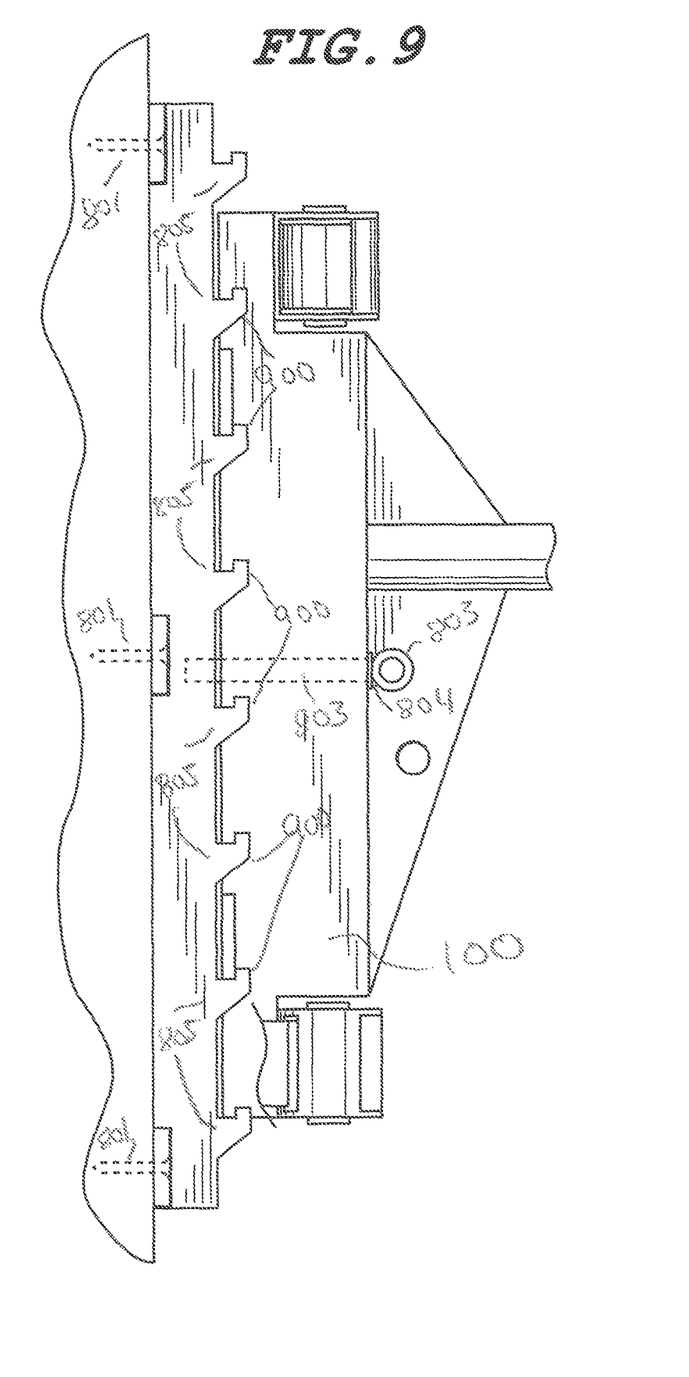
FIG. 9 is a drawing illustrating a side view of the portable exercise apparatus attached to a wall mount, according to an embodiment.

FIG. 9 is a drawing illustrating a side view of the portable exercise apparatus attached to a wall mount, according to an embodiment.

A set of grooves 900 on the back side of the body 100 is configured to fit onto the hooks 805 on the wall unit 800.

As such, the body 100 can be placed on the wall unit 800 at any one of a number of discrete heights by positioning the body to the desired height, hooking the body 100 on to a respective hook on the wall unit 800 and then inserted the key 803 through the key hole 804 and into a respective hole out of the wall unit holes 802. Once the body 100 is attached to the wall unit 800 in this manner, then the user can assemble the connectors and utilize the exercise apparatus as described herein (e.g., do pull-ups, etc.) As such, the portable exercise apparatus can also be utilized indoors as well.

Figure 10:
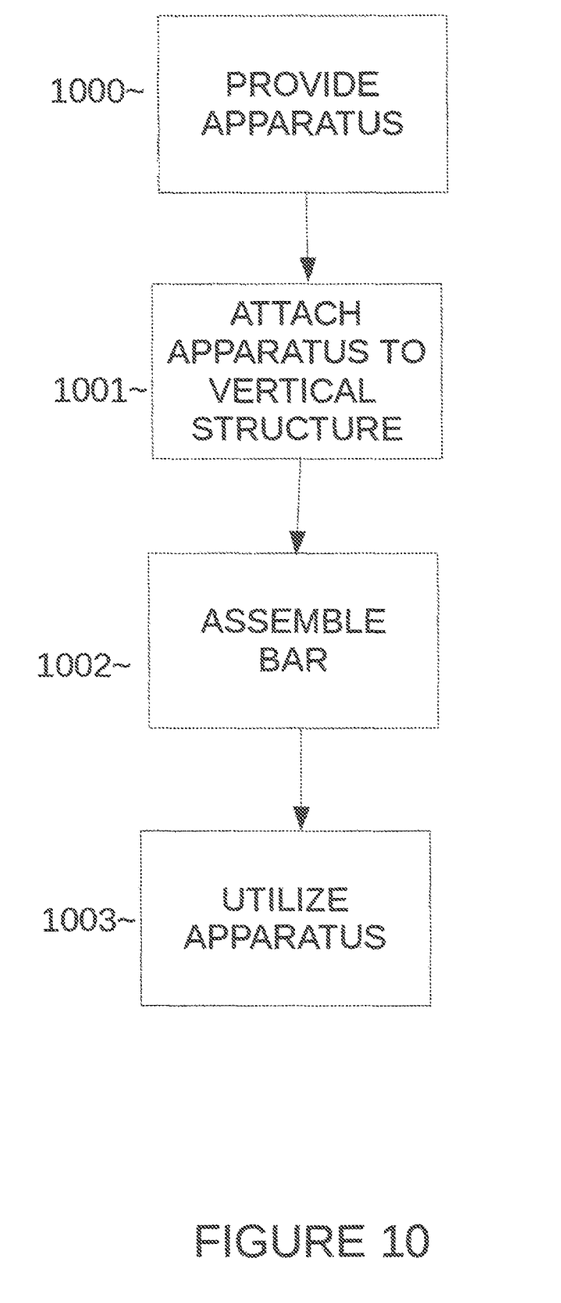
FIG. 10 is a flowchart illustrating a method of utilizing a portable exercise apparatus, according to an embodiment.

FIG. 10 is a flowchart illustrating a method of utilizing a portable exercise apparatus, according to an embodiment.

The method can begin with operation 1000, which provides the apparatus as described herein.

From operation 1000, the method proceeds to operation 1001, wherein the user attaches the apparatus to a vertical structure (e.g., a tree). This can be done as described herein.

From operation 1001, the method proceeds to operation 1002, wherein the user assembles the bar. This can be done as described herein (e.g., attaching all of the three connectors together).

From operation 1002, the method proceeds to operation 1003, wherein the user utilizes the apparatus by performing exercises (or other physical activities) using the apparatus.

Note that in a further embodiment, the integrated connector 103 can be any size and can even be short (e.g., one inch or less). In other words, the integrated connector can be used as a connector to other devices. Other attachments besides the middle connector 200 and the end connector 201 can be attached to the integrated connector 103. For example, a split bar can be attached to the integrated connector 103, a split bar being a bar that splits into two separate bars which can be utilized for different exercises. Other attachments that can attach to the integrated connector 103 can be a chair, child swing set, tent, etc. All of these connectable devices would have a compatible connector which would connect to the integrated connector 103. A volley ball net can also have an attachment which would connect to the integrated connector 103 or instead the volley ball net can have a hook on the end which can hook into the bottom triangular plate hole 602 (or any other hole in the apparatus). Note that holes can be placed (punched) anywhere in the apparatus which can be used for attaching hooks which are attached to any type of equipment (e.g., nets, tents, etc.) Also, in a further embodiment, the integrated connector does not have to extrude outside of the body but can instead be internal to the body (e.g., a recessed area inside the body such as a hole where another connector would be inserted inside the recessed area in the body and firmly connect using a button/hole (or other mechanism) as described herein or known in the art (e.g., the recessed area inside the body can have threads and an attachment which connects inside the recessed area would have corresponding threads which would screw into the threaded recessed area). As such, the integrated connector can extrude or be recessed and serve as a connector to connect a lot of different types of apparatuses/equipment which have their own connector adapted to connect to the integrated connector.

Note that all of the components described herein can be made from any suitable materials. For example, the strap can be made from any suitable material, such as nylon, rope, etc. The other parts can all be made from any combination of suitable materials, such as steel, aluminum, plastic, aluminum-steel alloy, etc. Note that while the word "strap" is used herein to refer to a strap forming the top strap and the bottom strap, instead of a strap other similar types of material can be used such as cord, rope, string, chain, etc.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus, comprising:
   a body;
   a top strap partially housed in a top ratchet assembly attached to a top portion of the body;
   a bottom strap partially housed in a bottom ratchet assembly attached to a bottom portion of the body;
   an integrated connector directly and permanently attached to the body, and extending approximately 90 degrees from a side surface of the body;
   a top plate connected to the integrated connector and the side surface of the body and extending from a top surface of the integrated connector along the side surface of the body to the top portion of the body, the top plate having a first surface area;
   a bottom plate connected to the integrated connector and the side surface of the body and extending from a bottom surface of the integrated connector along the side surface of the body to the bottom portion of the body, the bottom plate having a second surface area greater than the first surface area of the top plate; and
   a first connector being elongated, cylindrical, and removably and collinearly attachable to a free end of the integrated connector.

2. The apparatus as recited in claim 1, wherein the top strap is rolled in a top rotatable coil inside the top ratchet assembly.

3. The apparatus as recited in claim 2, wherein the bottom strap is rolled in a bottom rotatable coil inside the bottom ratchet assembly.

4. The apparatus as recited in claim 1, wherein the first connector comprises a recessed edge configured to fit inside the integrated connector or the integrated connector comprises a recessed edge configured to fit inside the first connector.

5. The apparatus as recited in claim 1, further comprising a second connector configured to attach to the first connector.

6. The apparatus as recited in claim 2, wherein the top ratchet assembly comprises a top ratchet arm configured to swing between an open position and a closed position thereby configured to tighten the top strap.

7. The apparatus as recited in claim 1, further comprising a top hook attached to the top strap.

8. The apparatus as recited in claim 7 further comprising a bottom hook attached to the bottom strap.

9. The apparatus as recited in claim 2, wherein the top ratchet assembly comprises a top hole.

10. The apparatus as recited in claim 1, wherein the bottom plate comprises a hole configured to receive a hook for attaching exercise equipment.

11. The apparatus as recited in claim 1, further comprising a set of grooves on a back side of the body.

12. The apparatus as recited in claim 11, further comprising a wall unit, the wall unit comprising a set of hooks configured to fit into the set of grooves.

13. The apparatus as recited in claim 12, further comprising:
    a key;
    a key hole located inside the body; and
    a set of wall unit holes located on the wall unit.

14. The apparatus as recited in claim 1, wherein a back side of the body is coated with a non-slip coating.

15. A method comprising:
    providing an apparatus comprising:
        a body;
        a top strap partially housed in a top ratchet assembly attached to a top portion of the body;
        a bottom strap partially housed in a bottom ratchet assembly attached to a bottom portion of the body;
        an integrated connector directly and permanently attached to the body, and extending approximately 90 degrees from a side surface of the body;
        a top plate connected to the integrated connector and the side surface of the body and extending from a top surface of the integrated connector along the side surface of the body to the top portion of the body, the top plate having a first surface area;
        a bottom plate connected to the integrated connector and the side surface of the body and extending from a bottom surface of the integrated connector along the side surface of the body to the bottom portion of the body, the bottom plate having a second surface area greater than the first surface area of the top plate; and
        a first connector being elongated, cylindrical, and removably and collinearly attachable to a free end of the integrated connector;
    attaching the body to a vertical structure by tightening the top strap around the vertical structure and the bottom strap around the vertical structure;
    attaching the first connector collinearly to the free end of the integrated connector; and
    performing exercises using the integrated connector and the first connector of the apparatus.

16. The method as recited in claim 15, wherein the exercises are chin-ups.

17. The method as recited in claim 15, wherein the bottom plate comprises a hole configured to receive a hook for attaching exercise equipment.

\* \* \* \* \*